United States Patent [19]

MacLean et al.

[11] 4,064,756
[45] Dec. 27, 1977

[54] INSTRUMENT ASSEMBLY

[75] Inventors: John P. MacLean, Stafford; John C. Strickland, Houston, both of Tex.

[73] Assignee: Texaco Inc., New York, N.Y.

[21] Appl. No.: 741,279

[22] Filed: Nov. 12, 1976

[51] Int. Cl.² ........................................... G01K 13/02
[52] U.S. Cl. ................................. 73/349; 73/272 R; 116/101
[58] Field of Search ................. 73/349, 343 R, 422 R, 73/272 R; 116/112, 101; 403/28, 32, 337; 285/158, 192

[56] References Cited

U.S. PATENT DOCUMENTS

| 1,615,503 | 1/1927 | Brown | 73/349 X |
| 1,841,908 | 1/1932 | Noble | 73/349 X |
| 2,780,094 | 2/1957 | Fink | 73/349 |
| 2,814,952 | 12/1957 | Ryant, Jr. et al. | 73/349 |
| 3,000,213 | 9/1961 | Eves et al. | 73/349 |
| 3,011,004 | 11/1961 | Meador | 73/349 X |
| 3,459,047 | 8/1969 | Sumansky | 73/422 R |
| 3,550,886 | 12/1970 | Cave | 285/158 X |
| 3,719,080 | 3/1973 | Burgess | 73/194 B |
| 3,927,567 | 12/1975 | Novak et al. | 73/204 |

FOREIGN PATENT DOCUMENTS

| 145,745 | 3/1952 | Australia | 73/349 |
| 734,702 | 8/1955 | United Kingdom | 73/349 |

*Primary Examiner*—Daniel M. Yasich
*Attorney, Agent, or Firm*—Carl G. Ries; Thomas H. Whaley; Theron H. Nichols

[57] ABSTRACT

A temperature-sensitive instrument assembly for removable mounting within a vessel, flowline or the like including a flange plate for mounting onto a vessel or flowline nozzle; a hollow mounting tube mounted within and extending through the flange plate into the interior of the vessel, flowline nozzle or the like; a temperature-sensitive element positioned in and extending with the mounting tube into the interior of the vessel, flowline nozzle or the like, the mounting tube having an opening on the downstream side thereof to expose the temperature-sensitive element to fluid conditions within the vessel; and, a shield mounted on the mounting tube opposite from the mounting tube opening for protective positioning upstream of any fluid flow in the vessel, flowline nozzle or the like.

7 Claims, 2 Drawing Figures

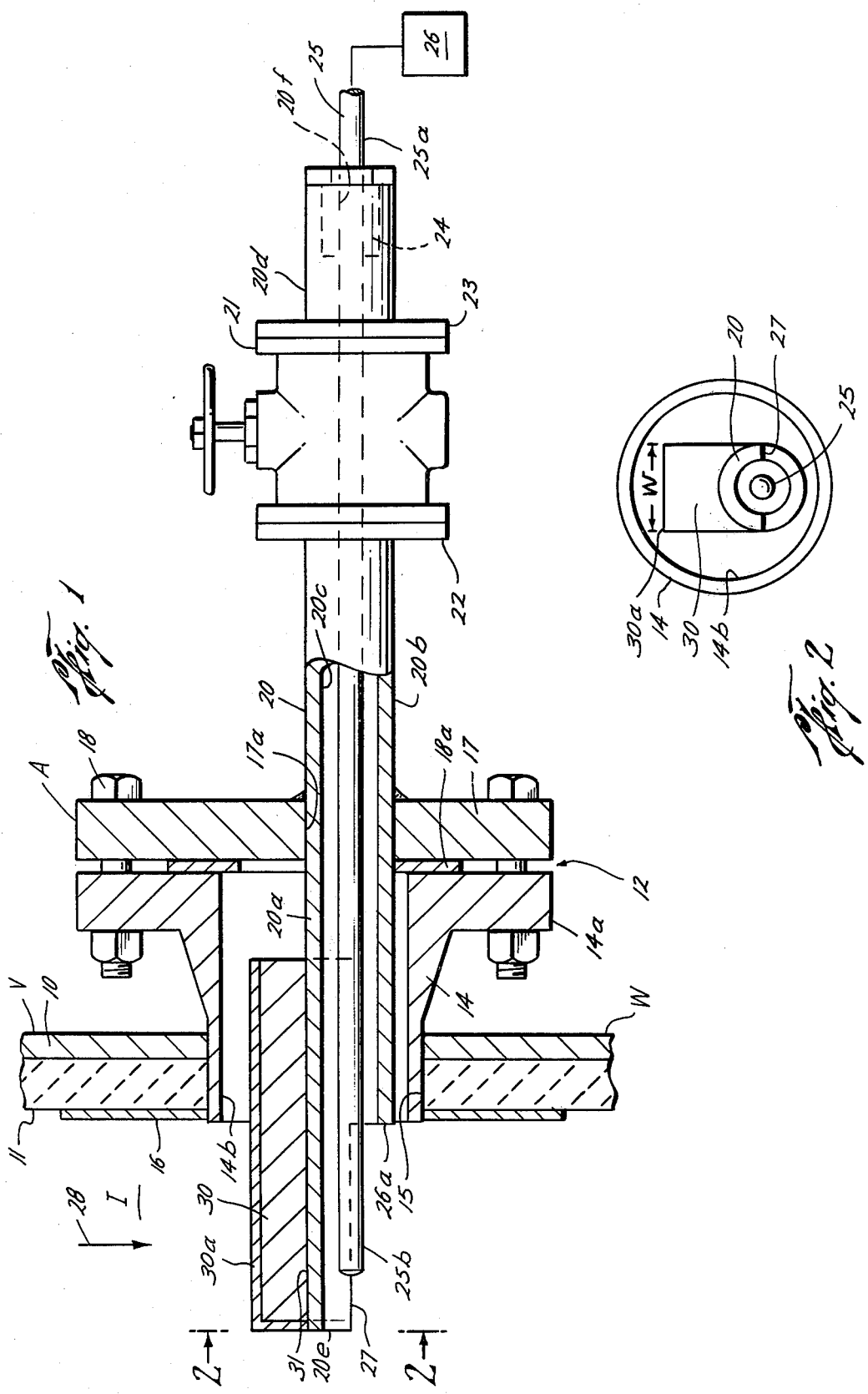

INSTRUMENT ASSEMBLY

BACKGROUND OF THE INVENTION

The field of this invention is instrumentation and in particular, instrument assemblies mounted in vessels, flowlines or the like that can be easily and safely removed as a unit.

A thermowell is an encapsulating container for a temperature-sensitive instrument and is well known in the art for placement in vessels, flowlines, reactors or other similar structures (referred to hereinafter collectively as "vessels") for indicating the temperature of the internal vessel environment. One type of thermowell may contain a thermocouple which provides an electrical signal indicative of the temperature within the vessel. This electrical signal is transmitted to known readout equipment for providing the user with an actual temperature reading. Such thermowells are capable of providing extremely accurate readings of the internal temperature of the vessel. The need for extremely accurate temperature readings has increased as technology in certain processes has become more and more sophisticated. For example, U.S. Pat. No. 3,433,733 of Bunn, Jr. discloses a fluid catalytic cracking process wherein it is very important to the process to obtain accurate readings of the temperature of the mixture of oil vapor and catalyst which serves as the feed material for the reaction portion of the process. Such thermowells are generally configured as a rod-shaped device and may be sheathed with a hard facing for protection. But in many applications, such as the mounting of a thermowell in a vessel used in the fluid catalytic cracking process of the Bunn, Jr. patent, the life of the thermowell is too short due to erosion from the fluid flow within the vessel. One partial solution to the erosion problem has been to mount the thermowell within a fully enclosed sleeve that extends into the vessel. This solution has proved unsatisfactory at least in part because some of the fluid heat is dissipated by heat conduction through the vessel shell thereby causing the thermowell to provide less than accurate temperature-indicating signals. Another solution has been to expose the thermowell to the internal environment of the vessel but to provide some type of upstream shield attached to the vessel in order to divert direct fluid flow away from direct impingement against the thermowell. While these solutions have been helpful, certain problems remain. For example, shields mounted directly to the vessel have not been totally successful in preventing failure of the thermowells; and, users or operators in such processes such as disclosed in the Bunn, Jr. patent are wary of changing the thermowell during actual process operation since there is a possibility of fluid escape. Secondly, to replace the shields, the entire process must be shut down and the vessel evacuated so that a welder or other craftsman can enter the vessel and replace the shield. Further, the use of such shields mounted directly to the inside wall of the vessel is impractical in small vessels where it is difficult for a craftsman to get access to the interior of the vessel to install or replace the shield.

SUMMARY OF THE INVENTION

It is an object of this invention to provide a new and improved instrument assembly adapted for removable mounting within a vessel in order to accurately determine the temperature therein.

The new and improved instrument assembly of the preferred embodiment of this invention includes a flange plate adapted for mounting onto a vessel outlet. A tube is mounted in the flange plate for extension through the vessel outlet into the interior of the vessel. A temperature-sensitive element is positioned within the mounting tube for extension with the mounting tube into the vessel. The mounting tube has an opening which exposes a portion of the thermowell directly to the fluid within the vessel. This opening is positioned downstream of any fluid flow through the vessel. A shield having a face oriented perpendicular to any flow through the vessel is mounted on the mounting tube opposite from the opening therein in order to protect the exposed thermowell from erosive effects of fluid flow through the vessel.

This description of the invention is intended as a summary only. The actual scope or protection sought is found solely in the claims.

BRIEF DESCRIPTION OF THE DRAWINGS

FIG. 1 is a view in section of the instrument assembly of the preferred embodiment of this invention mounted in a vessel wall; and FIG. 2 is an end view taken along line 2—2 of FIG. 1 illustrating the interior end of the instrument assembly of this invention.

DESCRIPTION OF THE PREFERRED EMBODIMENT

Referring to the drawings, the letter V generally represents a vessel, (which may be a vessel, flowline, reactor or other structure) which may be used as a part of any chemical process such as the fluid catalytic cracking process such as disclosed in U.S. Pat. No. 3,443,733. Only a wall portion W of the vessel V is actually illustrated in FIG. 1. The area to the left of the wall portion W is the interior I of the vessel V. The wall portion W includes a metal shell 10 having an inner erosion resistant or heat-insulating liner 11 of any known material for the purpose of heat insulating the interior I or providing protection to the wall portion W. The instrument assembly A of this invention is mounted in the vessel wall portion W for providing a signal indicative of the temperature condition within the interior I of the vessel, flowline nozzle, or the like V.

A flange assembly 12 is mounted in the vessel wall portion W. The flange assembly 12 includes a vessel nozzle or outlet 14 mounted in opening 15 in the wall portion W. The vessel nozzle 14 is generally cylindrical in configuration and terminates in a flange portion 14a. The vessel nozzle 14 has an opening or bore 14b therethrough for providing fluid communication to the vessel interior I. The vessel nozzle 14 is attached by welding to the wall W. An annular interior trim plate 16 supports the edge of the liner 11, and is mounted on the nozzle 14 within the vessel wall opening 15. The vessel nozzle 14 is exemplary of various types of vessel nozzles which may be utilized to provide a flange end connection 14a for the flange assembly 12.

The flange assembly 12 further includes a "blind flange" 17 which is mounted by flange nut and bolt connectors 18 to the outlet flange end 14a. The blind flange 17 is a solid, circular plate having the same outside diameter and bolt hole arrangement as the flange end 14a. The flange plate 17 is attached to flange end 14b by flange nut and bolt combinations 18 with gasket 18a positioned therebetween.

The instrument assembly A further includes a hollow, cylindrical mounting tube 20 which extends through opening 17a in the flange plate 17 into the interior I of the vessel V. The mounting tube 20 thus includes an interior portion 20a which is positioned in the vessel interior I and within the nozzle opening 14b and an exterior portion 20b which extends outwardly from attachment to the blind flange 17. The mounting tube 20 has a circular bore 20c which extends therethrough. A valve 21 is mounted by suitable means such as flange connections 22 and 23 to the exterior mounting tube portion 20b. The purpose of the valve 21 is to close off the bore 20c as described herein. An exterior end portion 20d is connected at the flange connection 23 and mounts at open end 20e thereof a packing gland 24.

The packing gland 24 is of any suitable known variety and serves to sealably mount a condition-sensitive element, such or but not limited to, a temperature-sensitive element or thermowell 25 in the mounting tube bore 20c. The condition sensed by the thermowell is the temperature of the fluid flowing in the vessel, as a gas or a liquid. Thus the thermowell is a temperature-sensing element, or temperature-sensing means. The thermowell 25 is an elongated, rod-shaped temperature-sensing element which extends through the bore 20c into the interior mounting tube portion 20a. The thermowell 25 is known in the art and includes a temperature-sensitive member or means (not shown) that provides an electrical signal to read-out equipment or gauge 26, also of known variety. The temperature-sensitive member or means of the thermowell 25 is fully encased in the rod-shaped material or sheath 25a which provides the exterior configuration illustrated in the drawings.

The thermowell 25 terminates in end portion 25b which is positioned within an opening 27 in the interior mounting tube portion 20a. The opening 27 is semi-circular in configuration and is provided by cutting away a semi-circular segment (not shown) of the interior mounting tube portion 20a on the downstream side of anticipated fluid flow, which is represented in the drawings as being in the direction of arrow 28. The interior end portion 25b of the thermowell 25 is actually positioned a small distance away from the interior mounting tube tip 20e. And, the opening 27 in the mounting tube 20 extends from the mounting tube tip 20e to wall section 26a. The wall section 26a lies in substantially a radial plane with respect to the mounting tube 20 and is positioned for approximate alignment with the trim plate 16.

A shield 30 is mounted onto the interior mounting tube portion 20a on the side 31 opposite from the opening 27. The shield 30 is a rectangular, solid metal block or bar having a width w equal to the outer diameter of the cylindrical mounting tube 20. The shield 30 has a flat, top face 30a oriented perpendicularly to the direction 28 of fluid flow in order to divert such flow away from the thermowell 25 with a minimum of erosion of the shield. The shield 30 is mounted onto the top 31 of the mounting tube 20 by any suitable means such as welding. The exterior surface of the shield 30 may be hardened or otherwise protected by a facing material if necessary in order to reduce the possibilities of corrosion or erosion. The shield 30 extends from the mounting tube interior tip 20e to a position within the vessel nozzle opening 14b. Thus the length of the shield as viewed in FIG. 1 is approximately twice the length of the opening 27, which would be the distance from mounting tube tip 20e to wall section 26a.

The instrument assembly A is used in the following manner. A vessel nozzle such as 14 is mounted in a vessel opening 15 and the instrument assembly A is attached to the vessel nozzle 14 by connecting the blind flange 17 to outlet flange end 14a by flange nut and bolt combinations 18. The instrument assembly A is then in the position of FIG. 1. The thermowell 25 is attached to the read-out equipment 26 so that the electrical signals provided by the thermowell 25 in response to temperature within vessel interior I can be recorded and/or displayed on the read-out equipment 26. During use, the face 30a of the shield 30 serves to divert flow away from the thermowell end 25b while allowing the thermowell end direct contact with the fluid within the vessel interior I, thus insuring that the temperature readings are very accurate. If it is necessary to change the thermowell 25, the thermowell 25 may be removed by pulling it outwardly of the packing gland 24. When the end of the thermowell 25 is outside of the valve 21, the valve may be shut so that fluid from the interior of the vessel I will not escape.

In spite of the fact that the utilization of the shield 30 in combination with the mounting tube 20 will provide for an increased life of the thermowell 25 as compared with instruments known in the art, it is anticipated that it will be necessary from time to time to replace the entire assembly A. This is done by removing the entire unit A including the blind flange 17 to which to the mounting tube 20 is attached. In this manner, even the shield 30 can be replaced without requiring that a craftsman attach any type of shield to the interior vessel wall. Thus, the instrument assembly A of this invention provides that the entire unit may be removable and replaced very easily and quickly and can thus be used for various sizes of vessels, including very small ones where a shield could not be mounted onto the inside of the vessel.

The foregoing disclosure and description of the invention are illustrative and explanatory thereof, and various changes in the size, shape and materials as well as in the details of the illustrated construction may be made without departing from the spirit of the invention.

For example, it is within the scope of this invention to utilize a condition-sensitive element or means for sensing another condition such as pressure rather than temperature. It is further within the scope of this invention to utilize the instrument assembly A with various types of vessel openings other than the nozzle 14. And, of course, the instrument assembly A can be utilized in any type of container wherein it is necessary to read a condition within the container.

We claim:

1. An instrument assembly adapted for mounting on a vessel for indicating a condition therein, comprising:
    a flange assembly mounted in a wall of such vessel;
    a hollow mounting tube mounted on said flange assembly for extending through an opening in the wall of such vessel into the interior thereof;
    a condition-sensitive means positioned in a thermowell in said mounting tube for extending through an opening in the wall of such vessel;
    said mounting tube being a preselected thickness and having an opening on the downstream side thereof for positioning within said vessel downstream of any fluid flow therethrough, said condition-sensitive means being exposed to fluid of said fluid flow through said downstream opening in said mounting tube to the interior of such vessel; and a shield having a width of at least equal to the diameter of said mounting tube and securedly mounted on said mounting tube opposite from said mounting tube opening for being positioned upstream of any fluid flow in such vessel having a solid surface on the upstream side of said mounting tube for diverting all fluid flow around said mounting tube for preventing erosion of the mounting tube and of the condition-sensitive means therein for at least partly projecting said condition-sensitive means from deleterious effects of fluid flow through such vessel while obtaining accurate information of the fluid condition therein.

2. The structure set forth in claim 1, wherein said flange assembly includes:
a flange plate mounted in an opening in a vessel nozzle having fluid communication with the interior of such vessel; and
said hollow tube being mounted in a flange plate opening for extension through said vessel wall opening.

3. The structure set forth in claim 1, wherein:
said mounting tube being cylindrical in cross-section and said opening therein being substantially semicircular in configuration; and
said condition-sensitive means being rod-shaped and extending through said mounting tube into the area of said mounting tube opening.

4. The structure set forth in claim 1, wherein:
said shield including a substantially flat face portion for positioning perpendicular to the direction of fluid flow in such vessel.

5. The structure set forth in claim 1, wherein said shield includes:
a rectangular metal bar mounted onto said mounting tube opposite from said opening.

6. The structure set forth in claim 1, wherein:
said condition-sensitive means is temperature responsive.

7. The structure set forth in claim 6, wherein:
said condition-sensitive means is a thermowell.

* * * * *